(12) United States Patent
Yamaguchi

(10) Patent No.: US 6,478,477 B1
(45) Date of Patent: Nov. 12, 2002

(54) PLANAR PACKAGED OPTICAL MODULE HAVING 1ST AND 2ND ADHESIVES WITH DIFFERENT GLASS-TRANSITION TEMPERATURES

(75) Inventor: Takahiro Yamaguchi, Tokyo (JP)

(73) Assignee: Oki Electric Industry Co., LTD, Tokyo (JP)

( * ) Notice: Subject to any disclaimer, the term of this patent is extended or adjusted under 35 U.S.C. 154(b) by 61 days.

(21) Appl. No.: 09/697,294

(22) Filed: Oct. 27, 2000

(30) Foreign Application Priority Data

Apr. 25, 2000 (JP) .......................................... 2000-123853

(51) Int. Cl.[7] ................................................ G02B 6/36
(52) U.S. Cl. ............................. 385/80; 385/92; 385/94
(58) Field of Search .............................. 385/92, 94, 80, 385/96, 98

(56) References Cited

U.S. PATENT DOCUMENTS

| | | | | |
|---|---|---|---|---|
| 4,647,150 A | * | 3/1987 | DeSanti et al. | 385/98 |
| 4,969,705 A | * | 11/1990 | Stoy et al. | 156/158 |
| 5,977,019 A | * | 11/1999 | Ozeki et al. | 427/150 |
| 6,019,522 A | * | 2/2000 | Kim | 385/31 |
| 6,086,704 A | * | 7/2000 | Kanai et al. | 156/267 |
| 6,208,397 B1 | * | 3/2001 | Shimodaira et al. | 349/112 |
| 6,331,882 B1 | * | 12/2001 | Shimodaira et al. | 349/117 |

* cited by examiner

Primary Examiner—Tulsidas Patel
Assistant Examiner—Chandrika Prasad
(74) Attorney, Agent, or Firm—Rabin & Berdo, PC

(57) ABSTRACT

A planar packaged optical module in which shifting of an optical fiber and a ferrule from their design positions and positional displacement of an optical fiber within a ferrule resulting from a movement of the optical fiber therein can be prevented, and which is suitable for reflow soldering. The planar packaged optical module of the present invention is provided with a housing formed of epoxy resin or the like with a lid, an Si substrate provided within the housing, a semiconductor laser device provided on the Si substrate, a ferrule which is adhered to a notch portion provided on the housing and which retains an optical fiber therein, and an optical fiber which is adhered to the Si substrate in a state in which the optical fiber is passed from the exterior of the housing to the inside of the housing through the ferrule and disposed therein so that one end surface of the optical fiber opposes an active layer of the semiconductor laser device. The ferrule and the optical fiber are adhered to one another by an adhesive which has a glass-transition temperature Tg higher than the glass-transition temperature of the adhesive which adheres the housing and the ferrule to one another.

5 Claims, 5 Drawing Sheets

PLANAR PACKAGED OPTICAL MODULE HAVING 1$^{ST}$ AND 2$^{ND}$ ADHESIVES WITH DIFFERENT GLASS-TRANSITION TEMPERATURES

BACKGROUND OF THE INVENTION

1. Field of the Invention

The present invention relates to a planar packaged optical module, and in particular a planar packaged optical module which reciprocally or unilaterally converts electrical signals and optical signals.

2. Description of the Related Art

A planar packaged optical module is an electronic part which reciprocally or unilaterally converts electrical signals and optical signals, and is principally used in key equipment for optical communications. Such a planar packaged optical module generally has a structure like the one illustrated in FIGS. 4 and 5A.

That is, a planar packaged optical module generally has a housing 50 formed of epoxy resin or the like with a lid (in FIG. 5A, the lid is indicated with a broken line 62), an Si substrate 52 provided within the housing 50, a semiconductor laser device 54 (hereinafter referred to as an LD) provided on the Si substrate 52, a ferrule 56 which is adhered by an adhesive to the housing in a state in which the ferrule 56 is passed through the housing 50, and an optical fiber 58 which is adhesively retained within the ferrule 56 and is adhered to the Si substrate 52 in a state in which the optical fiber 58 is disposed so that one end surface of the optical fiber 58 opposes an active layer of the LD 54.

The Si substrate 52 is provided with an optical fiber mounting portion 52a and an LD mounting portion 52b which are separated by a separation groove 52c. A V-groove for mounting the optical fiber is formed on the optical fiber mounting portion 52a along a direction perpendicular to the separation groove 52c. The LD 54 which converts electrical signals inputted from the outside into optical signals is fixedly provided on the LD mounting portion 52b.

The optical fiber 58 is disposed at a position such that one end surface of the optical fiber 58 precisely opposes the active layer of the LD 54. The optical fiber 58 is retained within the ferrule 56 at a notch portion of the housing 50. Within the housing 50, in a state in which a glass plate 60 which prevents the optical fiber 58 from rising up out of the V-groove is provided, the contact surface of the optical fiber 58 is adhesively fixed in the V-groove (not illustrated), which is provided on the optical fiber mounting portion 52a, by an adhesive 67 of UV hardenability or the like. The end surface of the optical fiber 58 which opposes the active layer of the LD 54 is stress-ruptured to a mirror-finished surface, while the other end surface of the optical fiber 58 is polished to a convex spherical surface.

The ferrule 56 which retains the optical fiber 58 at a notch portion of the housing 50 is structured to be substantially cylindrical. The ferrule 56 adhesively retains at the inner peripheral surface thereof the optical fiber 58 with an adhesive, while the outer peripheral surface of the ferrule 56 is fixed to the housing 50 with an adhesive. The adhesive which fixes the ferrule 56 to the housing 50 and the adhesive which fixes the optical fiber 58 to the inside of the ferrule 56 are epoxy resin adhesives which have a glass-transition temperature Tg of about 125° C.

In the planar packaged optical module of the structure described above, lead portions 72 are placed on electrodes 82 of a distribution substrate 80 with solder balls 84 interposed between the lead portions 72 and the electrodes 82, as illustrated in FIG. 6A. Thereafter, the electrodes 82 of the distribution substrate 80 and the lead portions 72 are electrically bonded by leaving them for about thirty seconds in a high-temperature environment at 240° C., as illustrated in FIG. 6B.

In the planar packaged optical module of the structure described above, the housing and the ferrule, and the ferrule and the optical fiber are respectively adhered to one another with an adhesive made of a resin, and the glass-transition temperature Tg of these adhesives is of a range of from about 100° C. to about 125° C.

When the electrodes 82 of the distribution substrate 80 are bonded with the lead portions 72 by solder balls or the like in a high-temperature environment at 240° C. for a bonding time of thirty seconds, the adhesive which binds the housing and the ferrule and the adhesive which binds the ferrule and the optical fiber undergo glass-transition and harden once they have softened at almost the same time.

Because the adhesive which binds the housing and the ferrule and the adhesive which binds the ferrule and the optical fiber are fixed once they have softened at virtually the same time, sometimes the optical fiber slips out of position in the direction in which it is drawn into the housing at the time the adhesives have softened, as illustrated in FIG. 5B.

When such positional displacement occurs, the output variance from the optical fiber ends up exceeding 1 dB and noise increases. Therefore, there has been the drawback in that bonding by a reflow soldering which uses solder balls or the like is difficult.

SUMMARY OF THE INVENTION

In order to overcome such drawbacks, an object of the present invention is to provide a planar packaged optical module in which shifting of an optical fiber and a ferrule from their design positions and positional displacement of the optical fiber within the ferrule resulting from a movement of the optical fiber therein can be prevented, and which is suitable for reflow soldering.

In order to achieve this object, the invention according to the first aspect is a planar packaged optical module which includes a conversion device provided on a substrate within a housing and when supplied with one of an electric signal and an optical signal substantially converts one into the other; an optical fiber retained by a retaining member adhered to the housing and fixed on the substrate such that an end surface of the optical fiber opposes the conversion device; a first adhesive which adheres the housing and the retaining member to one another, the first adhesive substantially formed of a resin having a predetermined glass-transition temperature; and a second adhesive which adheres the retaining member and the optical fiber to one another, the second adhesive substantially formed of a resin having a glass-transition temperature greater than that of the first adhesive.

In the invention according to the first aspect, the glass-transition temperature of the second adhesive, which adheres the retaining member and the optical fiber to one another, is higher than the glass-transition temperature of the first adhesive, which adheres the housing and the retaining member to one another. Therefore, the time at which the adhesive between the housing and the retaining member softens and hardens and the time at which the adhesive between the retaining member and the optical fiber softens and hardens are staggered. In particular, the second adhesive which adheres the retaining member and the optical fiber to one another softens and hardens after the first adhesive which adheres the housing and the retaining member to one another softens and hardens.

Accordingly, displacement of the optical fiber due to movements of the optical fiber within the retaining member in an environment having a temperature higher than the glass-transition temperature of the adhesives at the time of reflow soldering and the like can be prevented, and the planar packaged optical module becomes suitable for reflow soldering.

It is preferable that the adhesives are thermoplastic resin adhesives. It is further preferable that the thermoplastic resin adhesives are epoxy resin adhesives.

As described above, according to the first aspect of the invention, effects can be obtained in that shifting of the retaining member from its design position in a high-temperature environment at the time of reflow soldering, and positional displacement of the optical fiber caused by a movement of the retaining member, can be prevented.

For this reason, because the planar packaged receptacle optical module can accommodate reflow soldering, an effect can be obtained in that, after reflow soldering, a state can be maintained in which the optical fiber and the active layer of the LD are aligned and opposed to one another with high precision.

BRIEF DESCRIPTION OF THE DRAWINGS

FIG. 6A is an explanatory view illustrating a state prior to packaging. FIG. 6B is an explanatory view illustrating a state after packaging.

DESCRIPTION OF THE PREFERRED EMBODIMENT

Figure 1:
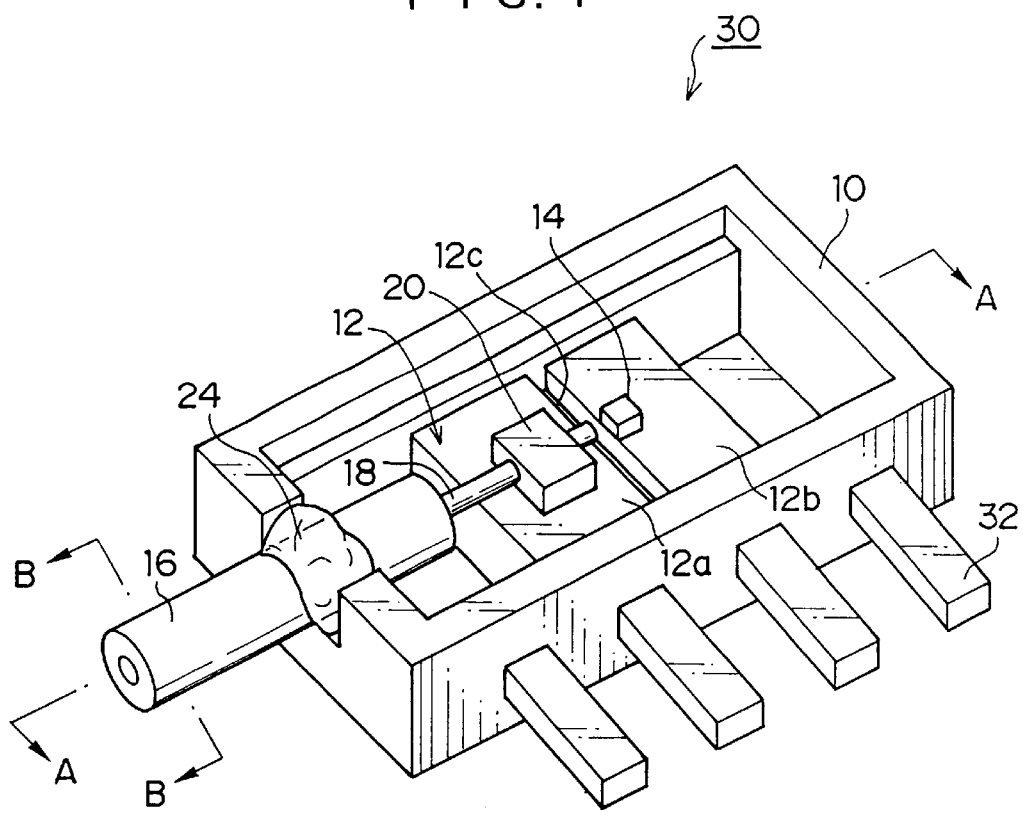
FIG. 1 is a partial perspective view which illustrates a structure of a planar packaged receptacle optical module of an embodiment of the present invention.

An embodiment of the present invention will hereinafter be described with reference to FIGS. 1 to 3. As illustrated in FIG. 1, a planar packaged receptacle optical module of the present embodiment is provided with a housing 10 formed of epoxy resin or the like with a lid (not illustrated in FIG. 1), an Si substrate 12 provided within the housing 10, a semiconductor laser device 14 (hereinafter referred to as an LD) provided on the Si substrate 12, a ferrule 16 which is adhered to a notch portion provided on the housing and which retains an optical fiber 18 therein, and an optical fiber 18 which is adhered to the Si substrate 12 in a state in which the optical fiber 18 is disposed so that it is inserted from the exterior of the housing to the interior of the housing by being passed through the ferrule 16, and one end surface of the optical fiber 18 opposes an active layer of the LD 54. The housing 10 corresponds to a housing of the present invention, the ferrule 16 corresponds to a retaining member of the present invention, and the optical fiber 18 corresponds to an optical fiber of the present invention.

Figure 2:
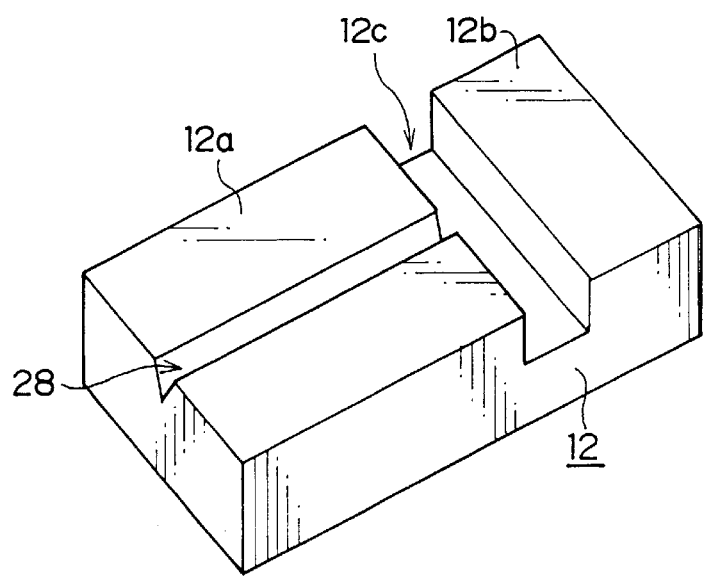
FIG. 2 is a perspective view which illustrates a structure of an Si substrate shown in FIG. 1.

As illustrated in FIG. 2, an upper layer of the Si substrate 12 is divided by a separation groove 12c into an optical fiber mounting portion 12a and an LD mounting portion 12b. A V-groove which extends in a direction perpendicular to the separation groove 12c is formed on the optical fiber mounting portion 12a in a central portion thereof. An LD 14 which converts electrical signals inputted from the outside into optical signals is fixedly positioned on the LD mounting portion 12b so that the active layer of the LD is aligned with a high degree of precision at a position determined in advance with respect to the V-groove. The alignment is conducted by using an infrared-transmitting dice bonder or the like at a submicron unit.

Figure 3A:
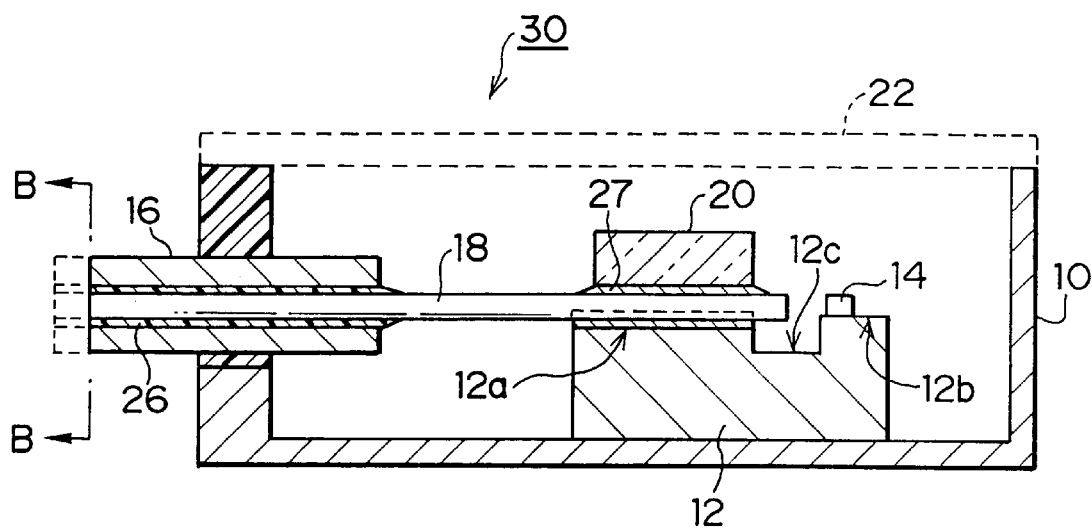
FIG. 3A is a sectional view cut along the line A—A of FIG. 1.

As illustrated in FIG. 3A, the optical fiber 18 is disposed at a position such that one end surface of the optical fiber 18 precisely opposes the active layer of the LD 14. The optical fiber 18 is retained within the ferrule 56 at a notch portion of the housing 10. Within the housing 10, in a state in which a glass plate 20 which prevents the optical fiber 18 from rising up out of the V-groove is adhered over the optical fiber 18, the optical fiber 58 is adhered in the V-groove 28 by an adhesive 27 of UV hardenability or the like. The end surface of the optical fiber 18 which opposes the active layer of the LD 14 is stress-ruptured to a mirror-finished surface, while the other end surface of the optical fiber 18 is polished to a convex spherical surface.

The ferrule 16 which retains the optical fiber 18 at a notch portion of the housing 10 is structured to be substantially cylindrical. The ferrule 16 adhesively retains at the inner peripheral surface thereof the optical fiber 18 with an epoxy resin adhesive 26 which has a glass-transition temperature Tg in the range of from about 90° C. to about 130° C. such as #9390 (product name; manufactured by NTT Advance Technology Co.). The epoxy resin adhesive which has a glass-transition temperature Tg in the range of from about 90° C. to about 130° C. corresponds to a second adhesive of the present invention.

Here, #9390 is used. However, other kinds of adhesives such as #UV1100 (product name; manufactured by Optdine Co.) or the like can be used as long as the adhesive has a glass-transition temperature Tg in a range of from about 90° C. to about 130° C. and has a glass-transition temperature Tg which is different from that of the adhesive which binds the housing 10 and the ferrule 16 (preferably, a glass-transition temperature Tg which is higher than that of the adhesive which binds the housing 10 and the ferrule 16) as will be described below.

The outer periphery surface of the ferrule 16 is adhered to the housing 10 by an epoxy resin adhesive 24 which has a glass-transition adhesion Tg in the range of from about 65° C. to about 90° C. such as #5813 (product name; NTT Advance Technology Co.). The epoxy resin adhesive 24 which has a glass-transition adhesion Tg in the range of from about 65° C to about 90° C. corresponds to a first adhesive of the present invention.

Here, #5813 is used. However, other kinds of adhesives such as #5814 (product name; manufactured by NTT Advance Technology Co.), #5815 (product name; manufactured by NTT Advance Technology Co.) or the like can be used as long as the adhesive has a glass-transition temperature Tg in a range of from about 65° C. to about 90° C. and has a glass-transition temperature Tg which is different from that of the aforementioned adhesive which binds the ferrule 16 and the optical fiber 18 (preferably, a glass-transition temperature Tg which is lower than that of the adhesive which binds the ferrule 16 and the optical fiber 18).

Figure 3B:
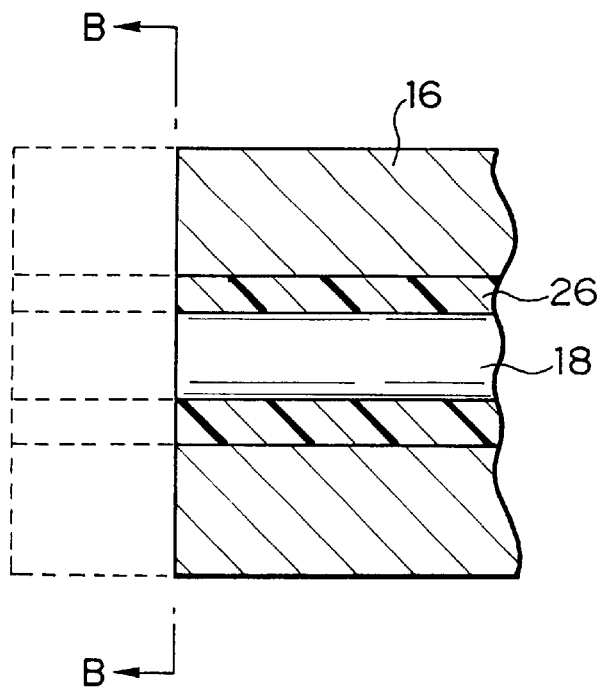
FIG. 3B is an expanded view cut along the line B—B of FIG. 3A.
Figure 4:
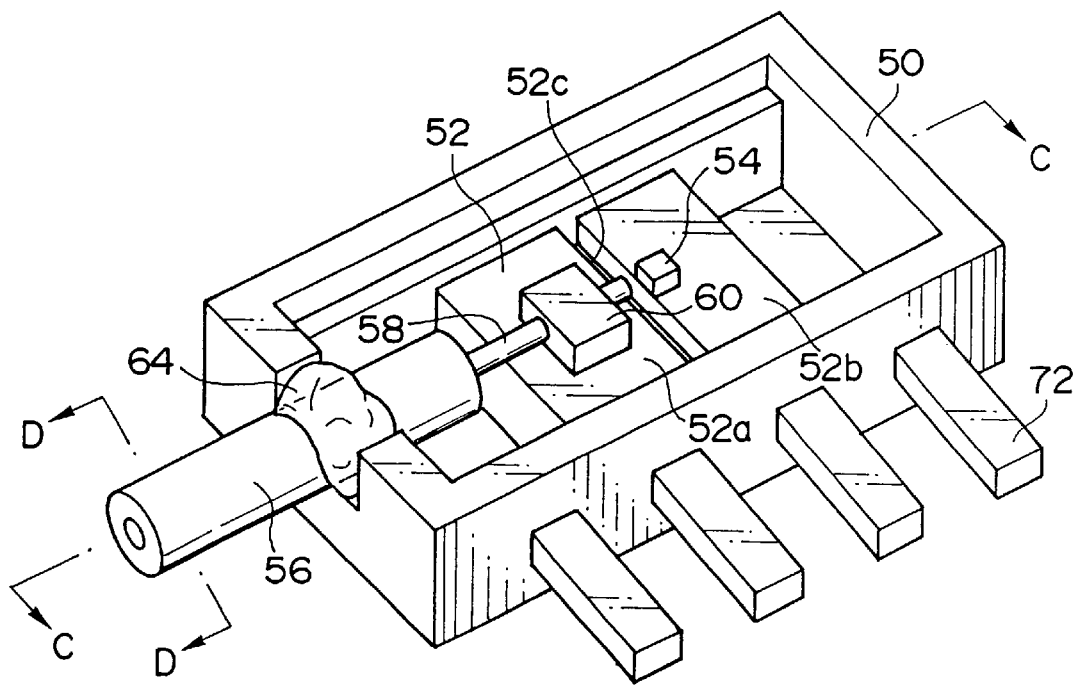
FIG. 4 is a partial perspective view illustrating a structure of a conventional planar packaged receptacle optical module.
Figure 5A:
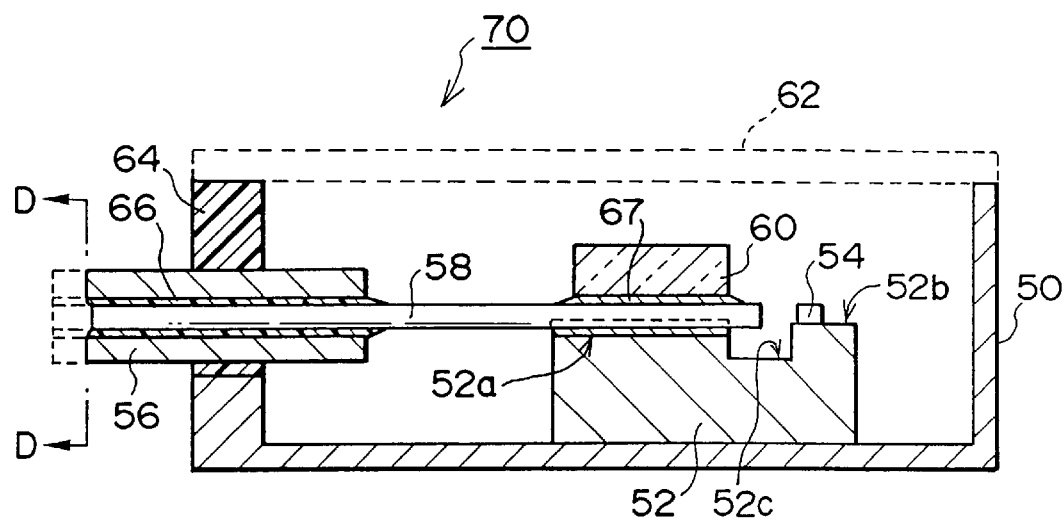
FIG. 5A is a sectional view cut along the line C—C of FIG. 4.
Figure 5B:
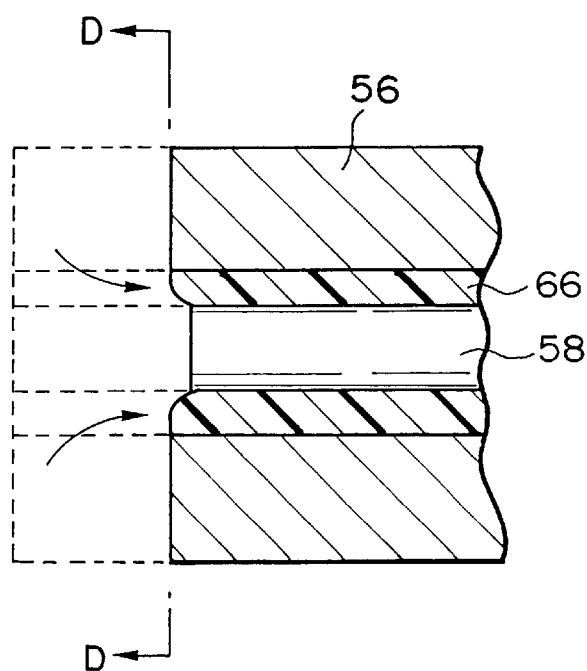
FIG. 5B is an expanded view cut along the line D—D of FIG. 5A.
Figure 6A:
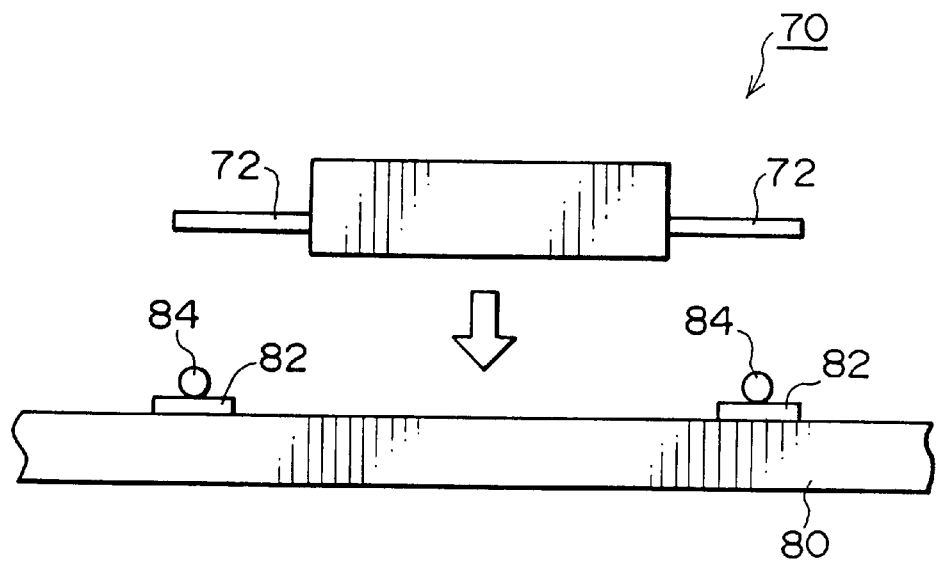
FIGS. 6A and 6B are explanatory views illustrating a packaging method of a conventional planar packaged receptacle optical module.
Figure 6B:
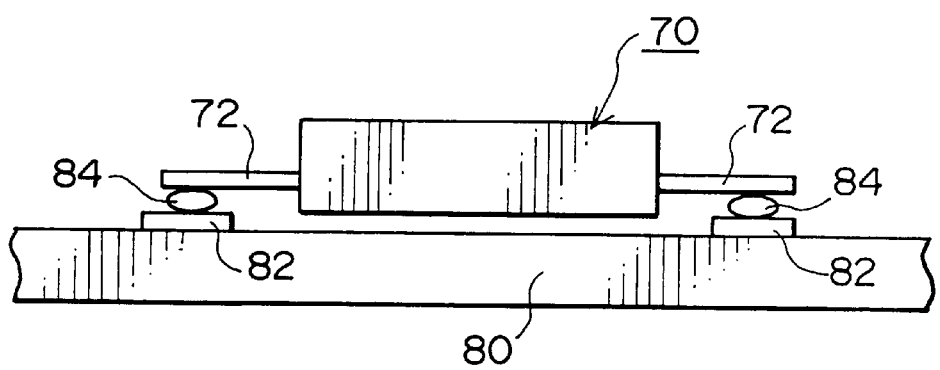

After lead portions 72 are placed on electrodes 82 of a distribution substrate 80 with solder balls 84 interposed between the lead portions 72 and the electrodes 82, the planar packaged optical module 30 having such a structure is left for about thirty seconds in a high-temperature environment at 240° C. As illustrated in FIGS. 3A and 3B, the result is a planar packaged optical module in which there is no positional displacement of the optical fiber within the ferrule and which is sufficiently suitable for reflow soldering.

In this manner, the planar packaged optical module of the embodiment of the present invention can prevent shifting of the optical fiber and the ferrule from their design positions and positional displacement of the optical fiber within the ferrule resulting from a movement of the optical fiber therein, and is suitable for a high-temperature environment at the time of reflow soldering.

The planar packaged receptacle optical module of the embodiment of the present invention is a transmission module which uses the LD 14 to convert electrical signals from the outside to optical signals. However, the present invention is not limited to a transmission module. In place of the LD 14, a light-receiving module which uses a light-receiving device photodiode may also be suitably used.

What is claimed is:

1. A planar packaged optical module comprising:
   a housing;
   a substrate provided within the housing;
   a conversion device provided in the housing, the conversion device being operable for converting one of an electric signal and an optical signal substantially into the other;
   an optical fiber connected to the housing with a retaining member, the retaining member being adhered to the housing by a first adhesive, and the optical fiber being adhered to the retaining member by a second adhesive, the optical fiber being fixed to the substrate such that an end surface of the optical fiber opposes the conversion device,
   wherein the first adhesive is made of a first resin having an intrinsic glass-transition temperature, and the second adhesive is made of a second resin having an intrinsic glass-transition temperature greater than the glass-transition temperature of the first resin.

2. The planar packaged optical module according to claim 1, wherein the first resin and the second resin are formed of thermoplastic resin.

3. The planar packaged optical module according to claim 2, wherein the first resin and the second resin are formed of epoxy resin.

4. The planar packaged optical module according to claim 3, wherein the glass-transition temperature of the first resin is from about 65° C. to about 90° C.

5. the planar packaged optical module according to claim 3, wherein the glass-transition temperature of the second resin is from about 90° C. to about 130° C.

* * * * *